US006845244B2

(12) United States Patent
Ide et al.

(10) Patent No.: US 6,845,244 B2

(45) Date of Patent: Jan. 18, 2005

(54) DIRECTIVITY CONTROL TYPE COMMUNICATION APPARATUS AND ADAPTIVE ARRAY ANTENNA APPARATUS

(75) Inventors: Minako Ide, Yokohama (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 88 days.

(21) Appl. No.: 10/376,634

(22) Filed: Mar. 3, 2003

(65) Prior Publication Data

US 2003/0148744 A1 Aug. 7, 2003

Related U.S. Application Data

(62) Division of application No. 09/530,542, filed on May 2, 2000, now Pat. No. 6,754,467.

(30) Foreign Application Priority Data

Sep. 11, 1998 (JP) .......................................... 10-258354

(51) Int. Cl.[7] ................................................. H04B 7/00

(52) U.S. Cl. ....................... 455/506; 455/25; 455/13.3; 342/360; 342/367

(58) Field of Search ............................... 455/506, 13.3, 455/25, 115.1, 115.2, 279.1, 65, 63.4, 67.11, 515, 522, 562.1; 342/359, 360, 367, 139, 143, 357.09, 417, 81, 56, 113

(56) References Cited

U.S. PATENT DOCUMENTS

| | | | | | |
|---|---|---|---|---|---|
| 4,384,358 | A | * | 5/1983 | Shiki et al. | 375/347 |
| 5,610,617 | A | * | 3/1997 | Gans et al. | 342/373 |
| 5,642,348 | A | * | 6/1997 | Barzegar et al. | 370/277 |
| 5,894,598 | A | | 4/1999 | Shoki | |
| 6,377,812 | B1 | * | 4/2002 | Rashid-Farrokhi et al. | 455/522 |
| 6,678,309 | B1 | * | 1/2004 | Kitahara | 375/144 |
| 6,771,984 | B1 | * | 8/2004 | Hiramatsu et al. | 455/561 |
| 2003/0092379 | A1 | * | 5/2003 | Brothers et al. | 455/12.1 |
| 2004/0048593 | A1 | * | 3/2004 | Sano | 455/323 |
| 2004/0105489 | A1 | * | 6/2004 | Kim et al. | 375/140 |

FOREIGN PATENT DOCUMENTS

| | | |
|---|---|---|
| EP | 0807989 | 11/1997 |
| JP | 6197059 | 7/1994 |
| JP | 9074375 | 3/1997 |
| JP | 9219675 | 8/1997 |
| JP | 10117162 | 5/1998 |
| JP | 10276124 | 10/1998 |

* cited by examiner

*Primary Examiner*—CongVan Tran

(74) *Attorney, Agent, or Firm*—Stevens, Davis, Miller & Mosher, LLP

(57) ABSTRACT

The present invention relates to a method for adaptively controlling a transmission radiation pattern. Radio signals coming through a plurality of paths are received and demodulated for each path. The received level or received quality of each demodulated signal is compared to each other to select a signal with the highest level or most excellent quality. A path corresponding to a selected path is set at a path for transmission. When a plurality of signals each with an almost equal level or received quality exists in signals demodulated for each path, a history of transmission power control command (TPC) transmitted from a communication partner is referred. In other words, the reception condition in a communication partner is checked. Thereby, it is judged whether or not the currently selected path is appropriate as the path for transmission.

7 Claims, 8 Drawing Sheets

| | |
|---|---|
| 0 | +1dB |
| 1 | −1dB |

DIRECTIVITY CONTROL TYPE COMMUNICATION APPARATUS AND ADAPTIVE ARRAY ANTENNA APPARATUS

This is a divisional of prior application Ser. No. 09/530,542 filed May 2, 2000, now U.S. Pat. No. 6,754,467.

TECHNICAL FIELD

The present invention relates to a directional transmission method and directivity control type communication apparatus.

BACKGROUND ART

A cellular system is adopted in digital radio communication systems such as portable telephones and car telephones. In the cellular system, a communication area is divided into cells each provided with a base station, and a plurality of mobile stations concurrently communicate with the base station.

This cellular system has been rapidly spread recently, and users thereof have been also rapidly increased, resulting in the important subject that the channel capacity in a cell should be increased.

One of techniques to increase the channel capacity is an adaptive array antenna technique.

In the adaptive array antenna technique, an output from each antenna of an array antenna apparatus comprised of a plurality of antennas is added an amplitude shift and phase shift, and then combined, thereby forming directivities for transmission and reception.

In other words, a weight to be multiplied each antenna output is determined based on a predetermined algorithm, and each weight is varied corresponding to a variation of surrounding environments, thereby controlling the directivities for transmission and reception.

It is possible to attempt to increase the uplink channel capacity by applying the adaptive array technique to uplink channels, and canceling the interference from other cells to improve the reception quality. Concerning this technique, various reports are performed, for example, in academic societies.

Further, the study recently has started to apply the adaptive array technique to downlink channels.

Herein, the application of the adaptive array antenna to downlink channels means that a base station estimates a direction of arrival of the signal from a desired mobile station, and forms the transmission radiation pattern toward an estimated direction to transmit a signal.

The directional transmission with the adaptive array can decrease the transmission power from the base station with the channel quality maintained. Further, the interference to other mobile stations can be reduced. It is thereby possible to attempt to increase the downlink channel capacity.

The above-mentioned directional transmission is generally performed according to the procedures of analyzing a signal received under multipath phenomenon, determining a received level and received quality of the signal for each path, selecting a path such that an estimated propagation environment is the best, and transmitting a signal using the path.

However, it is sometimes difficult to select the optimal path actually. For example, in the case where carrier frequencies are different between transmission and reception, the case occurs that the best path for reception is not the best path for transmission.

Further the case occurs that the best path varies for an instant due to movement of a mobile station and change of propagation environment of radio signal. In such a case, the desirable effect cannot be obtained even if the directional transmission is performed using a path selected at the time of reception as a path for transmission.

The present invention is carried out based on the above-mentioned investigation. An object of the present invention is to enable accurate selection of a path that is optimal for transmission to achieve effective directional transmission.

DISCLOSURE OF INVENTION

In the present invention, a path for use in transmission is selected in consideration of information indicative of a reception condition at a communication partner indicating how a signal transmitted from this side is received at the communication partner, in addition to information concerning reception conditions of signals transmitted from the communication partner through a plurality of paths. It is thereby possible to select a more accurate transmission path.

In one preferred mode of a transmission radiation pattern forming method of the present invention, the transmission radiation pattern is determined by referring to information indicative of a previous reception condition in a communication apparatus of the communication partner, which was transmitted from the communication apparatus of the communication partner previously.

For example, a current transmission radiation pattern is changed when the previous reception condition in the communication apparatus of the communication partner is not desirable. The information that the previous reception condition in the communication apparatus of the communication partner is not desirable means that a transmission path currently selected may not be optimal. Accordingly, changing the transmission path to another selectable one increases the possibility that the reception condition in the communication partner is improved. Further, in the case where it becomes difficult to judge the selection of transmission path only using the reception condition of the signal transmitted from the communication partner, it is possible to select a desirable transmission path accurately.

In another preferred mode of the present invention, a transmit power control command (TPC) returned from the partner is monitored, and in the case where there is a plurality of paths in which received signal levels and received signal qualities are almost equal, the switching of transmission radiation pattern is performed based on the history of transmit power control command (TPC). In this case, since the information of the transmit power control command (TPC) is utilized to select the transmission path, it is not necessary to use a particular control signal, therefor facilitating the achievement.

Further, a communication apparatus of the present invention switches the transmission path referring to the information on the previous reception condition in the communication device of the communication partner, and adaptively controls the transmission radiation pattern. Using this communication apparatus as a base station in a CDMA communication enables the base station to decrease the transmit power with the communication quality maintained. It is thereby possible to reduce the interference degree that currently transmitted radio signals provide to other mobile stations. Accordingly it is possible to increase the downlink channel capacity.

BEST MODE FOR CARRYING OUT THE INVENTION

Embodiments of the present invention are explained specifically below with reference to accompanying drawings.

(First Embodiment)

Figure 1:
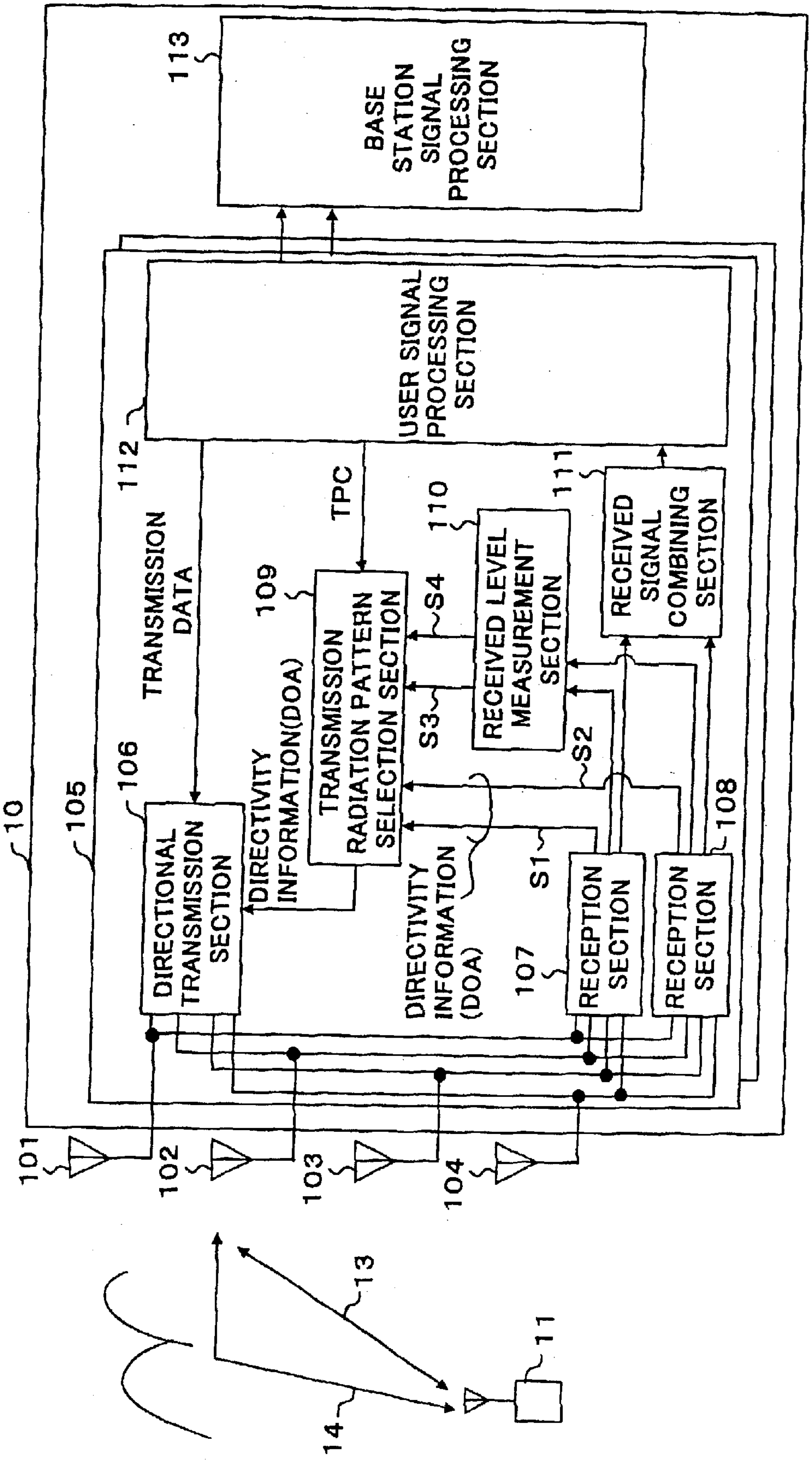
FIG. 1 is a block diagram illustrating a base station (communication apparatus) for use in a first embodiment of the present invention.

FIG. 1 is a block diagram of a communication apparatus using an adaptive array antenna apparatus.

In FIG. 1, base station 10 operates as a relay apparatus in a CDMA communication. This base station 10 has four antenna elements 101 to 104, a plurality of radio processing sections 105, and base station signal processing section 113. Radio processing sections 105 are provided for each user.

Each of radio processing sections 105 has directional transmission section 106, diversity reception sections 107 and 108, transmission radiation pattern selection section 109, received level measurement section 110, received signal combining section 111, and user signal processing section 112.

As illustrated in FIG. 1, signals transmitted from mobile station 11 arrive at four antenna elements 101 to 104 of base station 10 through path (propagation path) 13 and path 14 (propagation path).

Two arrival signals reach base station 10 each with a delay corresponding to a path distance. Base station 10 can receive and demodulate the two signals while distinguishing between them.

In other words, diversity reception section 107 receives a direct signal that arrives through path 13, and demodulates the signal. Further diversity reception section 108 receives a delayed signal that arrives through path 14, and demodulates the signal.

Controlling the reception directivity enables the arrival signal (multiplexed signal) to be separated into signals for each path through which the signal is transmitted, and received with the signals distinguished.

Namely, a plurality of arrival signals each has a delay corresponding to the path distance when arrives. Each delay time is compensated, and then the weight for an output from each of array antenna components is changed as appropriate. It is thereby possible to form a reception directivity that is appropriate to receive a signal transmitted through each path. Accordingly it is possible to separate the multiplexed signal into respective signals that are transmitted through the paths to receive.

Figure 2:
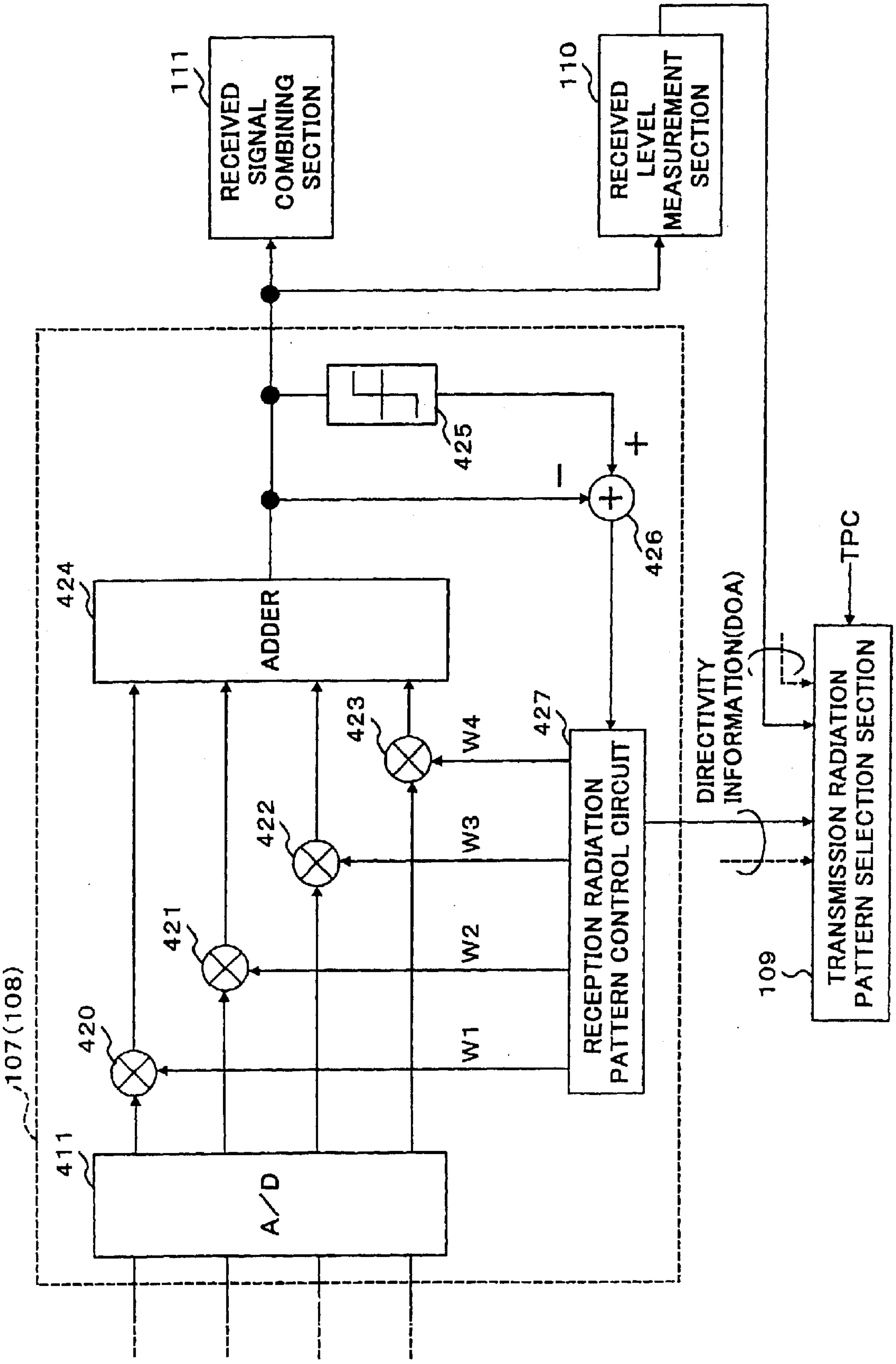
FIG. 2 is a block diagram illustrating a specific configuration of a diversity reception apparatus.

FIG. 2 illustrates an example of an internal configuration of diversity reception section 107 (108).

As illustrated in FIG. 2, diversity reception section 107 (108) has A/D converter 411, reception radiation pattern control circuit 427, four multipliers 420, 421, 422, and 423 that multiply an output data from the A/D converter by respective weights W1 to W4 outputted from reception radiation pattern control circuit 427, adder 424 that adds outputs from the respective multipliers, decider 426 that makes a hard decision on an output from adder 424, and error detection section 426 that detects an error between a decision by decider 426 and an output signal from adder 424.

Weights W1 to W 4 to be multiplied respective signals outputted from respective antenna elements are changed adaptively, whereby a phase and amplitude of the received signal is controlled, and the reception directivity is changed.

Reception radiation pattern control circuit 427 outputs each value of weights (W1 to W4) to transmission radiation pattern selection section 109 as directivity formation information S1 and S2.

As illustrated in FIG. 1, received signal combining section 111 performs maximal-ratio combining on respective output signals from diversity reception sections 107 and 108. The demodulated data is outputted to user signal processing section 112.

The respective signals from reception sections 107 and 108 are also outputted to received level measurement section 110, in which a level of the signal (i.e., received level) is measured for each signal.

Signals S3 and S4 each indicative of the measured level of the respective signal (received level) is outputted to transmission radiation pattern selection section 109. The information on the received level becomes a criterion to determine whether path 13 or path 14 is used as a propagation path to transmit a signal.

Transmission radiation pattern selection section 109 compares values of the received levels to each other, and then selects a path with a higher received level as a path for transmission. It is because the path with the higher received level is considered to be appropriate also as a path for transmission.

When there is no difference between the two received levels, the path for transmission is determined by referring to the history of the transmit power control command (TPC) outputted from user signal processing section 112. This processing is described later.

Herein, assume that path 13 is selected as the path for transmission.

In this case, it is necessary to form the transmission radiation pattern in the direction of path 13. Accordingly, in this case, transmission radiation pattern selection section 109 selects directivity information (DOA) S1 for path 13 outputted from reception section 107.

Then, the selected information is outputted to directional transmission section 106. As explained using FIG. 2, the directivity information (direction of arrival:DOA) described herein is the information on respective values of weights W1 to W4 to be multiplied respective outputs from antenna elements 101 to 104.

Directional transmission section 106 generates a directional transmission signal based on the directivity information (DOA) received from radiation pattern selection section 109.

In other words, directional transmission section 106 estimates the direction of selected path 13 based on the directivity information (DOA), and forms a transmission radiation pattern in the direction of selected path 13. The method for forming the transmission radiation pattern is the same as that for forming the reception directivity (FIG. 2). Specifically, directional transmission section 106 multiplies the transmission data outputted from user signal processing section 112 by the weight to control the amplitude and phase of the signal, and thereby forms the transmission radiation pattern.

Respective transmission signals outputted from directional transmission section 106 are transmitted from antennas 101 to 104 to mobile station 11.

FIG. 6 illustrates an example of formation of the transmission radiation pattern in the adaptive array antenna.

Figure 6A:
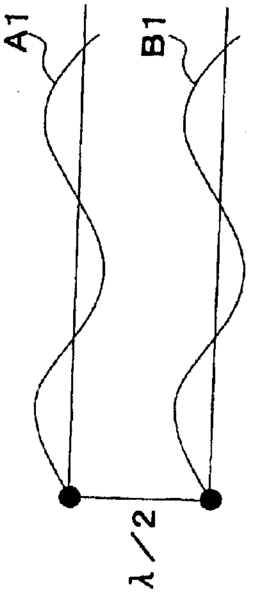
FIG. 6A is a diagram to explain a principle to form a transmission radiation pattern with an adaptive array antenna.
Figure 6B:
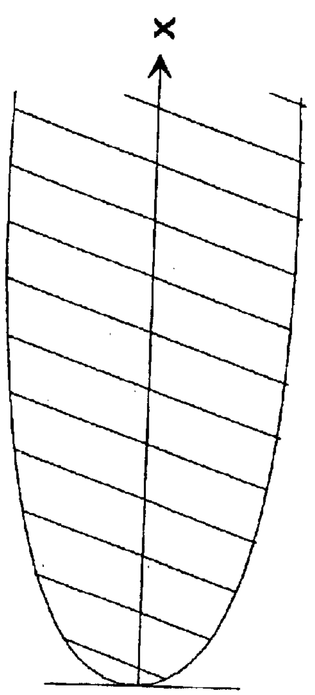
FIG. 6B is a diagram illustrating an example of the transmission radiation pattern.

As illustrated in FIG. 6A, when two signal waves with the same phase and same amplitude are outputted from antennas existing half the wavelength of the signal apart, the two signal waves (A1 and B1) are overlapped. Thereby, as illustrated in FIG. 6B, a broad transmission radiation pattern is formed in the direction vertical to the array antenna (x direction in FIG. 6).

Figure 6C:
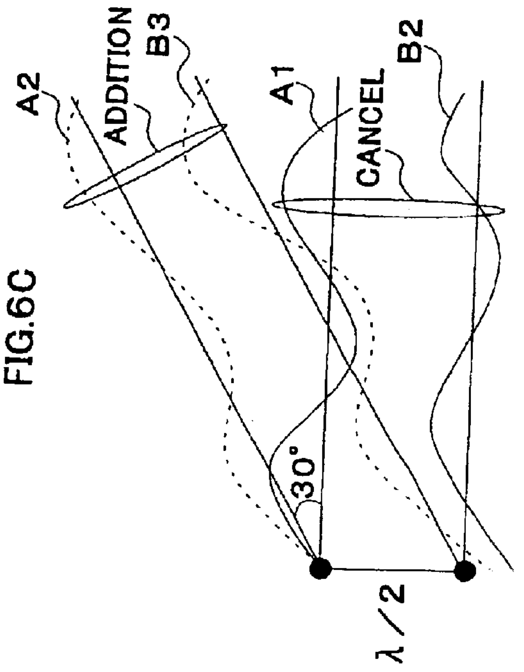
FIG. 6C is a diagram to explain the principle to form the transmission radiation pattern with the adaptive array antenna.
Figure 6D:
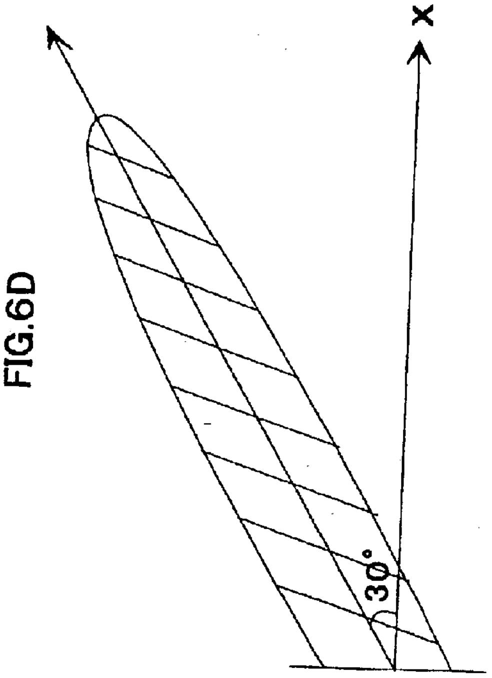
FIG. 6D is a diagram illustrating another example of the transmission radiation pattern.

Further, as illustrated in FIG. 6C, when two signal waves are outputted with the phases different by one-fourth the wavelength from each other, the two signal waves (A1 and B2) are cancelled in the direction the signal waves are outputted, and the two signal waves are added and enhanced in the direction at 30 degrees from the above-mentioned direction. Accordingly the transmission radiation pattern is formed in the direction at 30 degrees diagonally. Thus, the desired transmission radiation pattern is formed by controlling the phase, amplitude and others of the signal to be outputted from each antenna.

The basic operation of the directional transmission using the adaptive array antenna is as described above.

Herein, assume the case that the difference of received level between respective arrival signals through two paths 13 and 14 is not large in transmission radiation pattern selection section 109.

In this case, it is possible to use as the transmission path not only path 13 currently used, but also path 14. Therefore it is difficult to judge which path is more appropriate to use.

Then, in this embodiment, the information concerning the reception condition in mobile station 11 that is the communication partner is referred in this case. Specifically, it is examined whether a signal transmitted from base station 10 through path 13 currently used is received well in mobile station 11, and when the reception condition is good, the current transmission path is held, and when the reception condition is poor, the transmission path is switched to path 14.

In this embodiment, as the information concerning the reception condition in mobile station 11 that is the communication partner, transmit power control command (TPC) is used.

The transmit power control is the technique to adaptively vary a transmit power level to ensure optimal received levels in both a base station and mobile station. The transmit power control command (TPC) is a command to be added to the transmission signal to request a communication apparatus of a communication partner to increase or decrease the transmit power.

The TPC is data of 1 bit that is always added to the data of 1 slot transmitted from mobile station 11 to base station 10. The TPC is usually added after pilot channel data (PL).

Figures 3A, 3B:
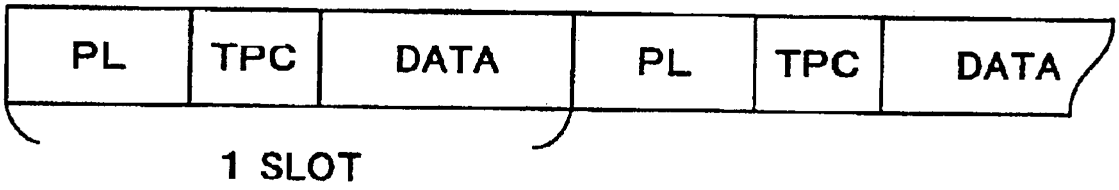
FIG. 3A is a diagram illustrating an example of data format in a mobile communication.
FIG. 3B is a diagram to explain transmit power control command (TPC)

As illustrated in FIG. 3B, the TPC of "0" means that a mobile station requests to increase the transmit power at a base station side by, for example, 1 dB, while the TPC of "1" means that the mobile station requests to decrease the transmit power at the base station side by 1 dB. Accordingly, in the case where the TPC of "0" appears successively, it is estimated that the reception condition in the mobile station deteriorates currently. In addition, whether or not the reception environment deteriorates can be determined easily by seeing whether or not "0" appears over the predetermined number of successive slots (the predetermined number of times).

In the present invention, such useful information indicated by the TPC is paid attention, and is utilized to switch the transmission path.

In other words, in the case where the judgment of transmission path selection becomes difficult due to coexisting received signals with almost equal received levels, transmission radiation pattern selection section 109 examines the history of the transmit power control command (TPC) outputted from user signal processing section 112.

If the TPC is indicative of the request to decrease the transmit power successively, it is considered that the reception of the signal transmitted through the currently selected transmission path (propagation path 13) is good, and the switching of the transmission radiation pattern is not performed.

If the TPC is indicative of the request to increase the transmit power successively, it is considered that the propagation environment of the currently selected transmission path deteriorates. Accordingly, transmission radiation pattern selection section 109 selects the directivity information (DOA) on path 14 to switch the transmission path, and outputs the selected directivity information (DOA) to directional transmission section 106. Thereby, the transmission path is switched from path 13 to path 14. As a result, the improvement of the reception condition in mobile station 11 is expected.

Thus, in this embodiment, in the case where the judgment to select either one as a transmission path becomes difficult due to appearance of a plurality of paths with almost equal received levels, the history of the transmit power control command (TPC) transmitted from a partner side is checked. In other words, it is possible to perform the switching of an appropriate transmission path by examining the reception condition of the partner side.

Figure 4:
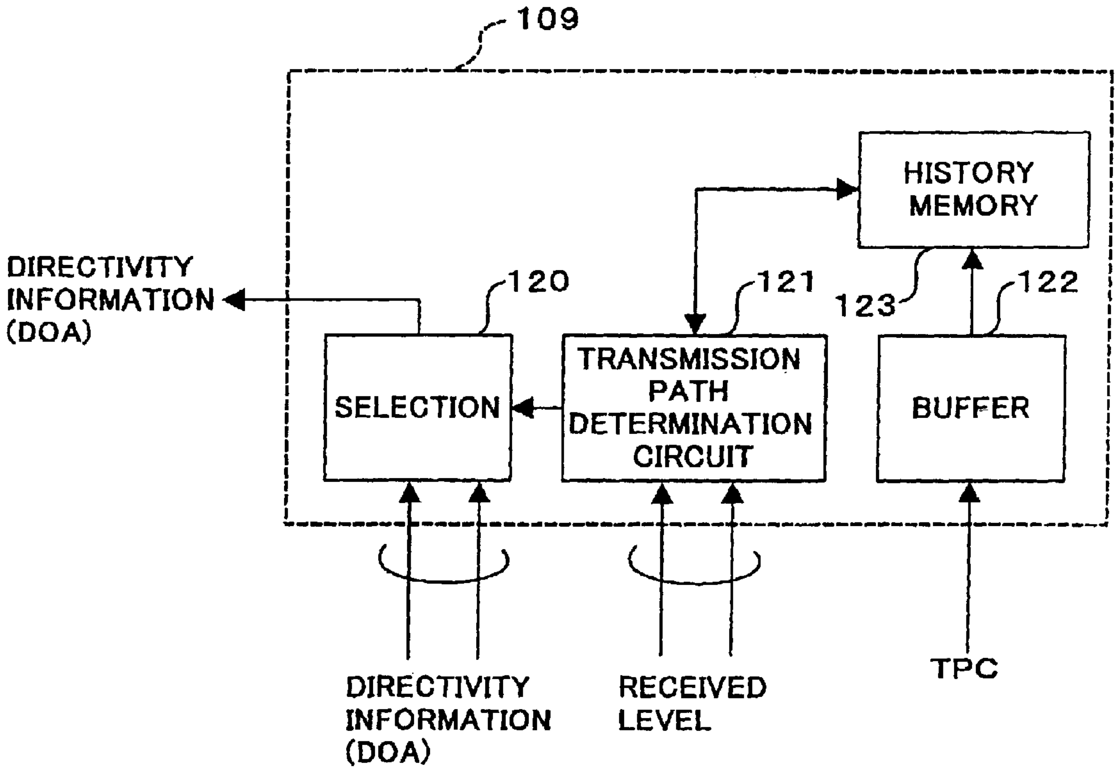
FIG. 4 is a block diagram illustrating a partial configuration of a transmission radiation pattern selection section for use in the first embodiment.

FIG. 4 is a block diagram illustrating a main configuration of transmission radiation pattern selection section 109.

Selection circuit 120 selects one from input directivity information (such as values of weights) obtained at the time of reception for each path, and outputs the selected information to directional transmission section 106.

Further, transmission path determination circuit 121 is a circuit that determines a path for transmission. The section 121 usually compares the input level of received signal for each path to each other, and determines a path corresponding to a signal with the maximum level as the path for transmission. However, in the case where a plurality of signals with the same levels appears, the section 121 determines the path for transmission by referring to the TPC data stored in history memory 123.

Further, buffer 122 is a buffer that functions as a communication interface, and once latches the transmit power control command (TPC) outputted from user signal processing section 112.

History memory 123 memorizes and stores previous TPC data. The TPC data is once latched in buffer 122, and then sequentially stored in history memory 123.

Transmission path determination circuit 121 reads out the TPC stored in history memory 123, and checks on how the values vary previously, in the case where it is difficult to judge whether or not the transmission path should be switched only by comparing received levels.

Figure 5:
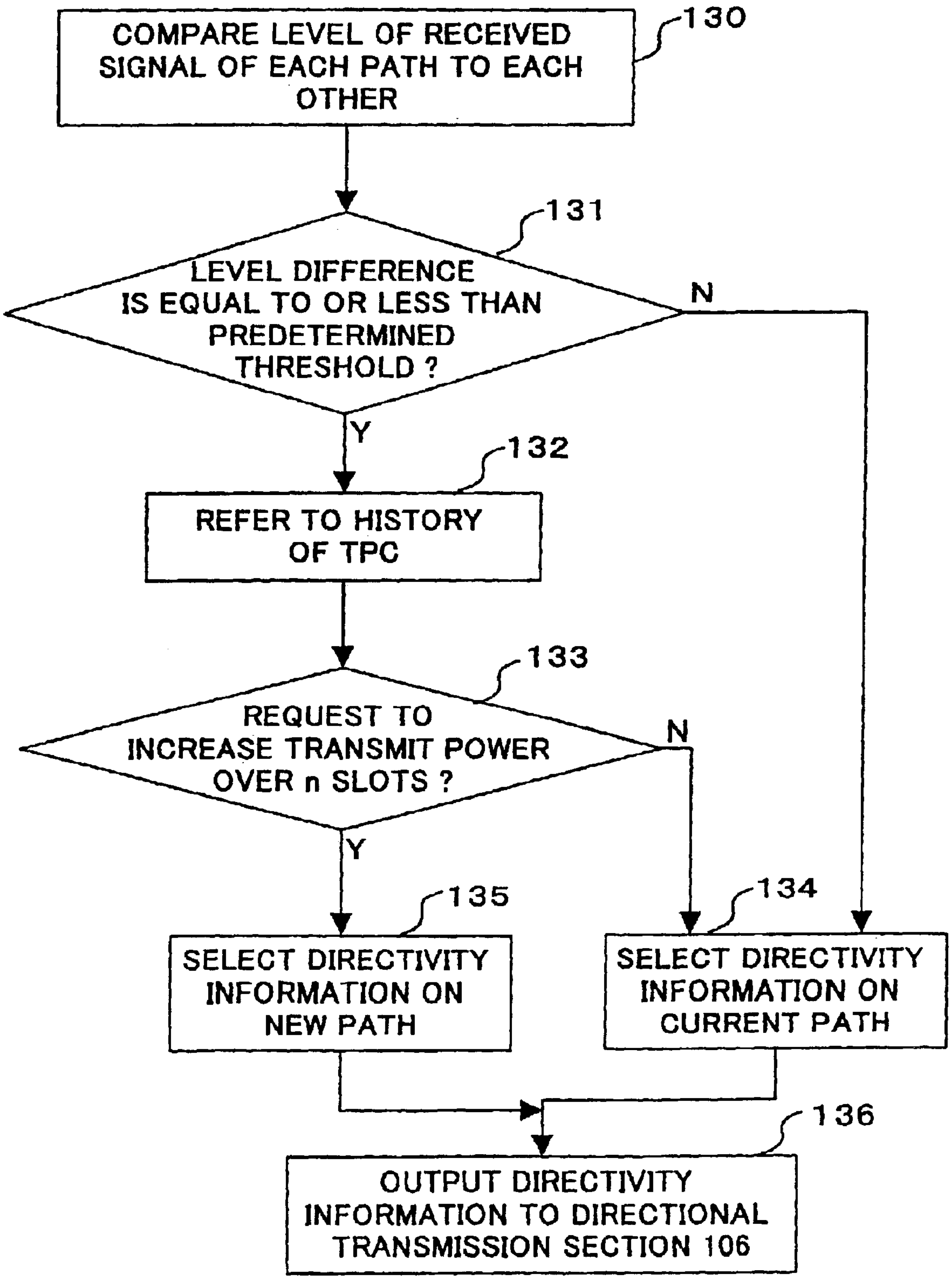
FIG. 5 is a flow diagram illustrating operations of the transmission radiation pattern selection section for use in the first embodiment.

The operation procedures of directional transmission selection section 109 with the above-mentioned configuration are illustrated in FIG. 5.

First, a level of the received signal for each path is compared to each other (step 130). At this time, using the level of the received signal corresponding to the currently selected path as a reference, a difference between the level of the other signal and that of the reference is obtained.

Next, it is determined whether the obtained difference of the received level is equal to or less than a predetermined threshold (step 131). Namely, it is examined whether a plurality of received signals with almost equal levels exists.

When the plurality of received signals with the almost equal level does not exist, the current path is continuously used as the transmission path. In other words, transmission path determination circuit 121 does not output an instruction to switch a path to selection circuit 120. Thereby, the directivity information (DOA) concerning the currently selected path is selected, and outputted to directional transmission section 106 (step 134).

On the other hand, when a received signal with a level almost equal to that of the received signal of the currently selected path appears, transmission path determination circuit 121 refers to the previous TPC data stored in history memory 123 (step 132). In other words, the previous reception condition in mobile station 11 is examined.

Specifically, it is examined whether mobile station requests the increase of the transmit power over N slots or more (N is a predetermined reference value) (step 133). If so, it is determined that the reception condition in the communication partner deteriorates.

Then transmission path determination circuit 121 determines that another path is used as the transmission path, and instructs selection circuit 120 to switch the transmission path (to use transmission path 14).

Selection circuit 120 selects the directivity information (DOA) on a new path (transmission path 14) when receives the instruction (step 135). The selected directivity information (DOA) is outputted to directional transmission section 106 (step 136).

On the other hand, in step 133, when the result obtained by referring to the TPC data shows that mobile station 11 does not request the increase of the transmit power over N slots or more, the path is not switched.

In other words, selection section 120 selects the directivity information (DOA) on the current path (step 134), and then outputs the selected information to directional transmission section 106 (step 136).

Thus, accurate transmission path switching is performed with the reception condition of the communication partner considered. It is thereby possible to switch the transmission radiation pattern accurately and promptly while adapting it to a variation of the propagation environment of the radio signal.

Further, utilized as the data to judge the reception condition of the partner side is the data contained in the current data format of the mobile communication, whereby a complicated procedure is not necessary at all such that particular data is added to transmission and received signals. Accordingly the present invention facilitates the practice thereof.

Furthermore, the interference degree, which the currently transmitted signal provides to other mobile stations, is reduced. Accordingly it is possible to increase the downlink channel capacity.

In addition, although the present invention is applied to the base station in the CDMA system in this embodiment, the present invention is not limited to the above case. For example, the present invention may be applied to other communication systems such as a TDMA system and TDD system. Further, if there is other data with which the reception condition of the partner side can be judged besides the TPC data, it may be possible to use the other data instead of the TPC data.

(Second Embodiment)

Figure 7:
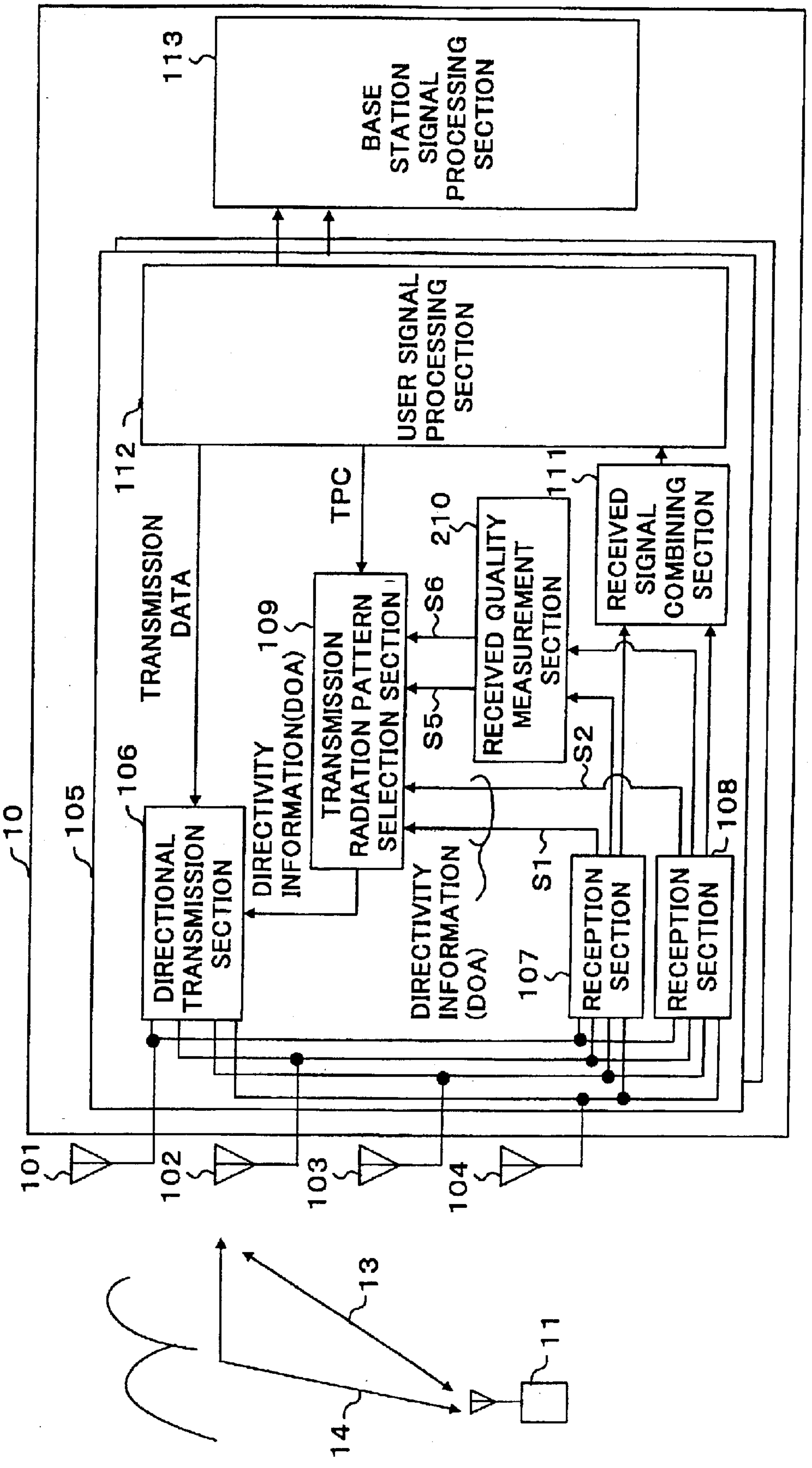
FIG. 7 is a block diagram of a base station apparatus (communication apparatus) according to a second embodiment of the present invention.

FIG. 7 is a block diagram of a CDMA communication apparatus (base station apparatus) according to the second embodiment. The configuration of the communication apparatus is almost the same as that of the communication apparatus in FIG. 1. In FIG. 7, the same sections as those in FIG. 1 are given the same reference marks as in FIG. 1.

However, in the communication apparatus in FIG. 7, received quality measurement section 210 is adopted instead of received level measurement section 110 illustrated in FIG. 1.

Namely the communication apparatus in this embodiment evaluates a quality of a received signal while taking S/N of the received signal into consideration in addition to the level of the received signal.

Then in the case where a plurality of reception paths exists, a path with a higher received quality is used as a transmission path. The other operations are the same as those in the communication apparatus in FIG. 1.

In other words, received quality measurement section 210 measures the received quality for each path. Information S5 and S6 each indicative of the measured received quality is transmitted to transmission radiation pattern selection section 109.

Transmission radiation pattern selection section 109 compares the received quality of each path to each other, selects the directivity information (DOA) on the path with the higher received quality, and outputs the directivity information (DOA) to directional transmission section 106.

In the case where transmission radiation pattern selection section 109 does not detect a large difference between received qualities of two respective paths, the section 109 examines the history of the transmit power control command (TPC) transmitted from mobile station 11, which is outputted from user signal processing section 112.

When the TPC is indicative of the request to decrease the transmit power, since the currently selected path is good, the switch of the transmission radiation pattern is not performed. When the TPC is indicative of the request to increase the transmit power continuously over the predetermined number of slots, it is considered that the propagation path of the currently selected path deteriorates. Accordingly transmission radiation pattern selection section 109 outputs the directivity information (DOA) on the other path to directional transmission section 106. The transmission path is thereby switched.

(Third Embodiment)

Figure 8:
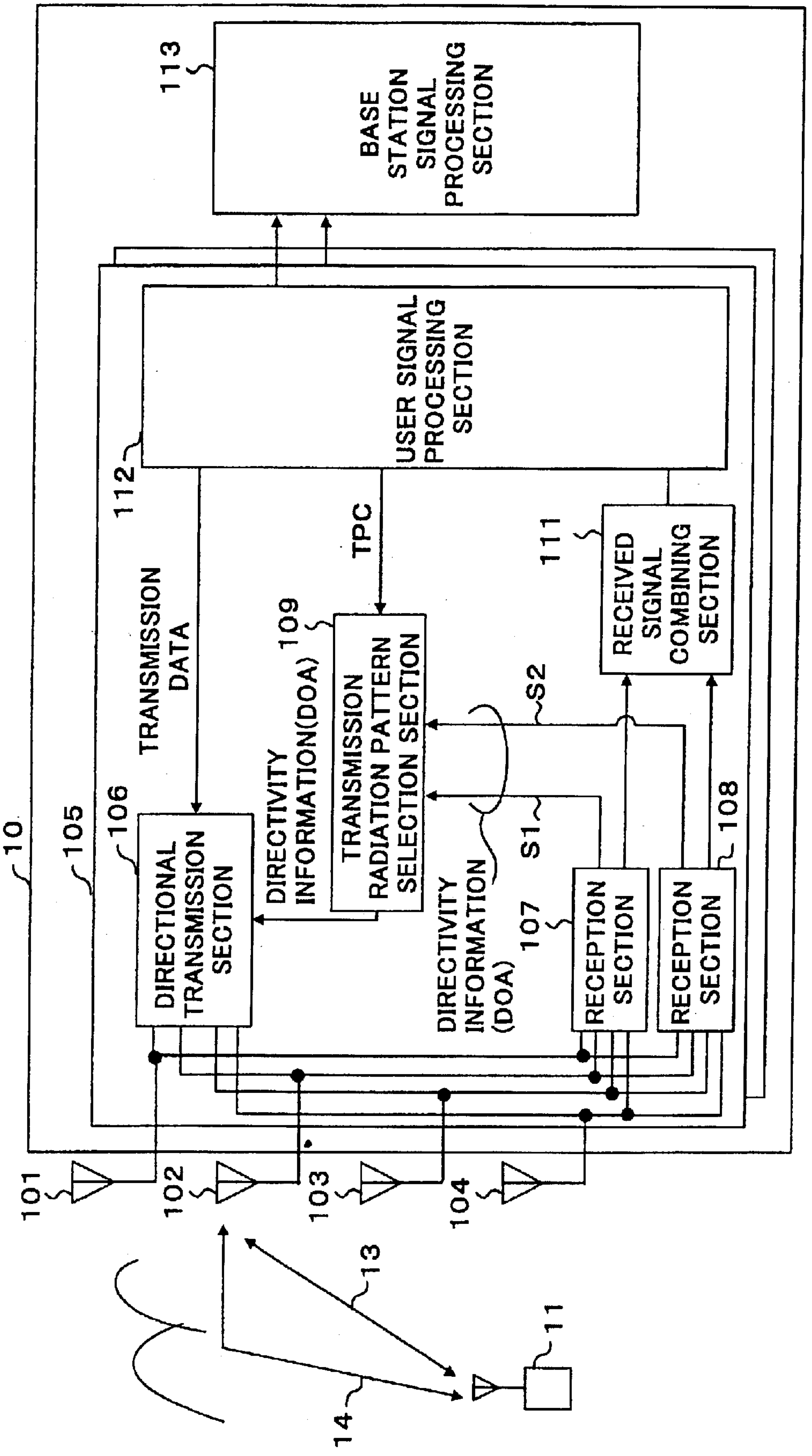
FIG. 8 is a block diagram of a base station apparatus (communication apparatus) according to a third embodiment of the present invention.

FIG. 8 is a block diagram illustrating a configuration of a CDMA communication apparatus (base station apparatus) according to the third embodiment of the preset invention.

The configuration of the communication apparatus is almost the same as that of the communication apparatus in FIG. 1. In FIG. 8, the same sections as those in FIG. 1 are given the same reference marks as in FIG. 1.

However, received level measurement section 110 illustrated in FIG. 1 is eliminated in the communication apparatus in FIG. 8.

In other words, reception directivity information (DOA) on each reception path is selected with a predetermined method (not limited particularly), and it is judged whether or not the selection is correct by monitoring TPC data. Then, when it is judged that the currently selected path is not appropriate, the transmission path is switched to the other path.

While the path switching in this case can be performed based on a predetermined criterion, the path switching may be performed randomly without preparing a particular criterion. In other words, the communication apparatus first switches the transmission path to another path, and waits for the TPC returned from a partner side. Then, the apparatus determines whether the transmission path is further switched to the other path or returned to the original path by seeing a value of the TPC.

As described, the present invention is explained with three embodiments. The apparatus of the preset invention performs the directional transmission, and always monitors and stores the TPC data that is returned from a communication partner as a result of the directional transmission. Then, the apparatus refers to the stored TPC data when needs to judge whether or not to perform switching of a transmission path in the case where, for example, a plurality of signals with almost equal received signal levels or received qualities appears.

Namely, the technique of the closed-loop control is introduced to the formation of the transmission radiation pattern. It is thereby possible to switch the transmission radiation pattern accurately and promptly while adapting it to a variation of the propagation environment of the radio signal.

It is thereby possible to improve communication qualities in the mobile communications. Further it is possible to attempt to improve the performance of the communication apparatus that performs the directional transmission such as the adaptive array antenna apparatus. Further the interference degree, which the currently transmitted radio signal provides to other mobile stations, is reduced, and accordingly it is possible to increase the downlink channel capacity.

Furthermore, since the present invention utilizes the transmit power control command (TPC) that is the data already used in the CDMA communication, it is not necessary to add particular control information to transmission and received signals. Accordingly the present invention facilities the practice thereof.

This application is based on the Japanese Patent Application No. HEI10-258354 filed on Sep. 11, 1998, entire content of which is expressly incorporated by reference herein.

INDUSTRIAL APPLICABILITY

As obvious from the above explanation, the directional transmission method and directionality control type communication apparatus of the present invention are useful to be used in mobile communications, and more particularly, are appropriate as a method and apparatus that adapt the directivities of transmission and reception to a variation of the communication environment fast and accurately.

What is claimed is:

1. A directivity control type communication apparatus, comprising:

a directional reception section that receives a multiplexed signal transmitted under multipath phenomenon, while controlling a reception directivity, and demodulates a signal for each of a plurality of paths;

a buffer that stores information indicative of a previous reception condition in a communication apparatus of a communication partner previously transmitted from said communication apparatus of the communication partner;

a transmission path determination section that determines a signal transmission path by referring to the information indicative of said previous reception condition stored in said buffers;

a selection section that selects, from among reception directivity information for each of said plurality of paths, reception directivity information for the signal transmission path determined by said transmission path determination section; and a directional transmission section that forms a transmission radiation pattern based on the reception directivity information outputted from said selection section to perform directional transmission.

2. The directivity control type communication apparatus according to claim 1, wherein:

said transmission path determination section selects a received signal having one of a maximum received level and a maximum received quality, from among received signals demodulated for each path in said directional reception section, when a plurality of signals having almost equal values exist;

said transmission path determination section selects a received signal by referring to a history of the information indicative of the previous reception condition; and said transmission path determination section sets a path corresponding to the selected received signal as the signal transmission path.

3. The directivity control type communication apparatus according to claim 1, wherein the information indicative of the previous reception condition is information on a value of a transmit power control command (TPC) transmitted from said communication apparatus of the communication partner.

4. An adaptive array antenna apparatus, comprising:

a plurality of antenna elements;

a directional reception section that forms a reception directivity for each of a plurality of path, while adaptively varying a plurality of weighting values, and demodulates a signal for each path, wherein each of the weighting values is for multiplying a signal received at a corresponding one of said plurality of antenna elements;

a buffer that stores a transmit power control command transmitted from a communication partner, wherein the transmit power control command is indicative of the communication partner's reception condition;

a transmission path determination section that determines a signal transmission path by referring to the transmit power control command stored in said buffers;

a selection section that selects a value, corresponding to the signal transmission path, to output; and a directional transmission section that forum a transmission radiation pattern based on said value, outputted from said selection section, to perform directional transmission.

5. The adaptive array antenna apparatus according to claim 4, wherein:

said transmission path determination section associates one of a received level and a received quality of the signal demodulated for each of the plurality of paths with a reception indicator for the corresponding path;

said transmission path determination section compares each of the reception indicators to the others to select a reception path having the greatest received level or received quality, when the reception indicators have almost equal values;

said transmission path determination section refers to a history of said transmit power control command to select a reception path, when the reception indicators do not have almost equal values; and said transmission path determination section determines a path corresponding to the selected reception path as the signal transmission path.

6. A CDMA communication apparatus that performs transmission and reception processing on a spread signal using the adaptive array antenna apparatus according to claim 4.

7. A base station apparatus that performs reception processing or transmission processing on a baseband spread signal respectively transmitted from a mobile station or to be transmitted to the mobile station, using the adaptive array antenna apparatus according to claim 4.

* * * * *